United States Patent Office 3,411,836
Patented Nov. 19, 1968

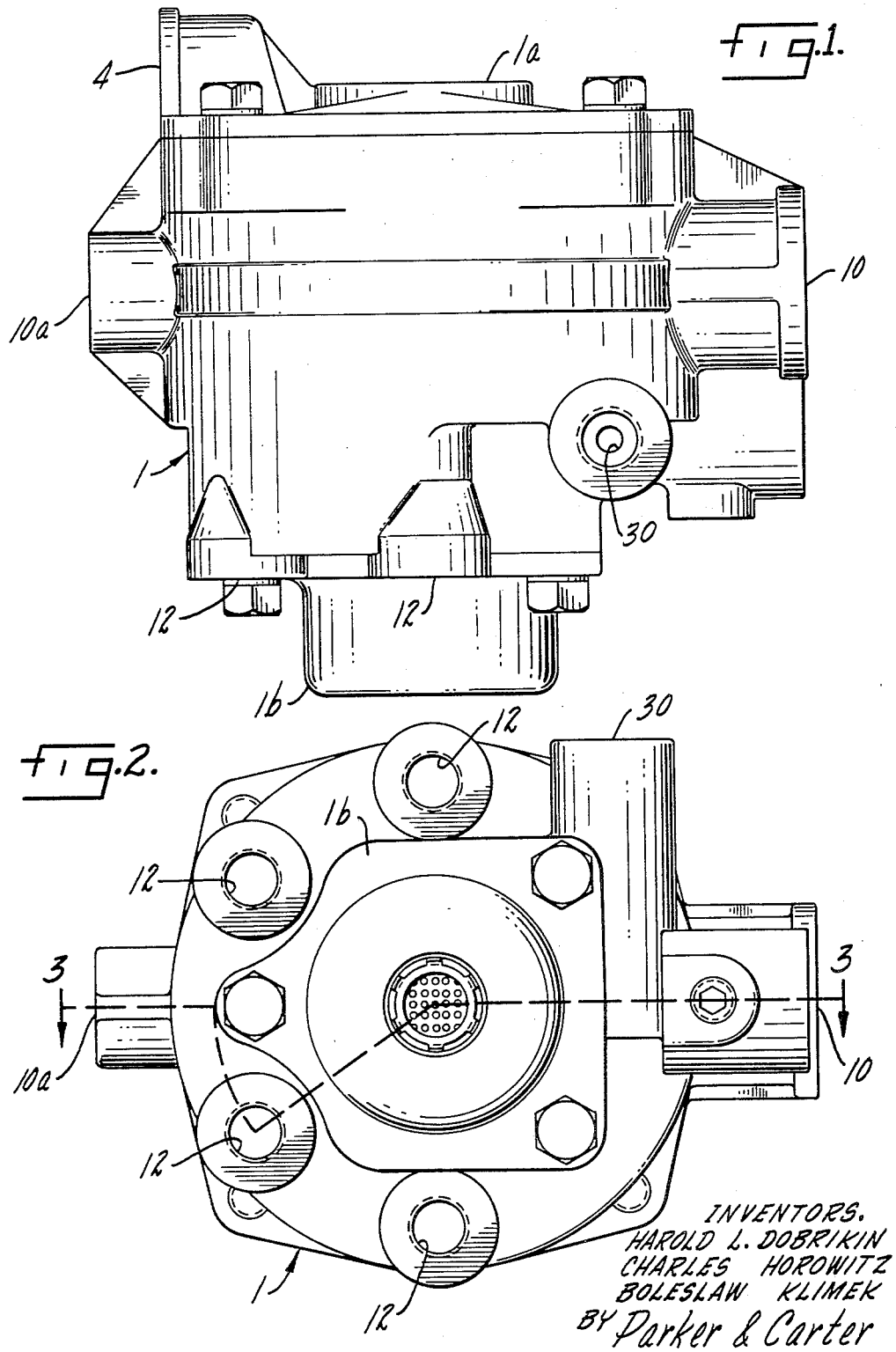

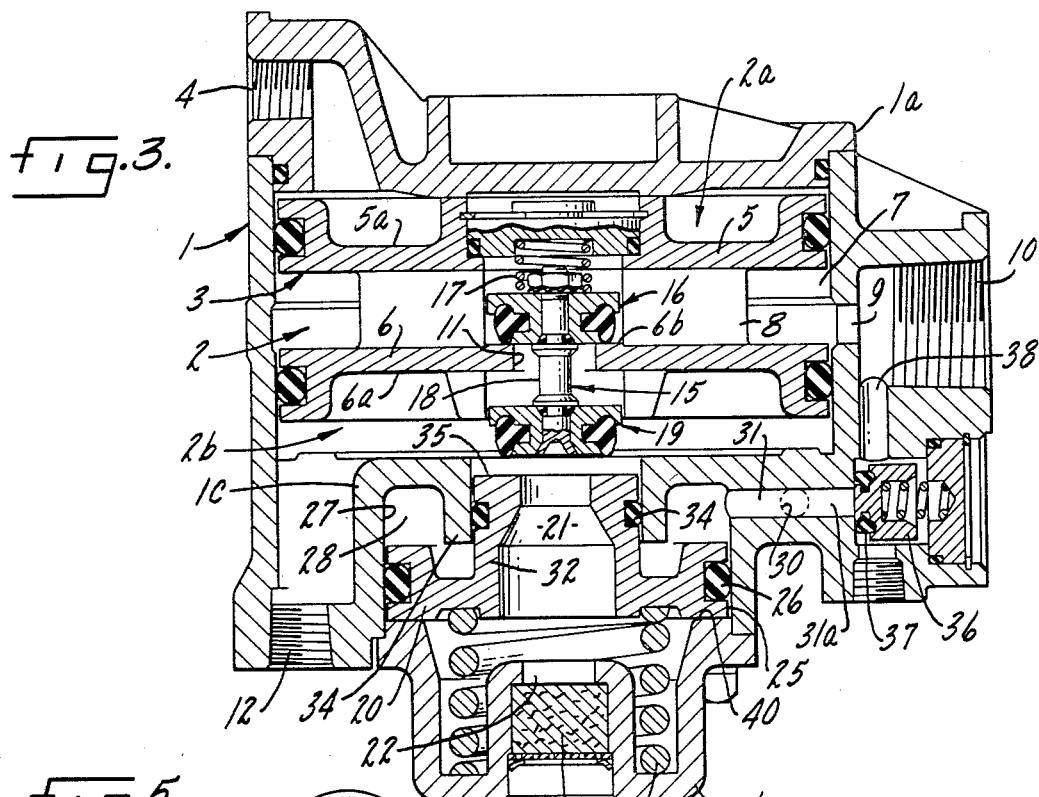
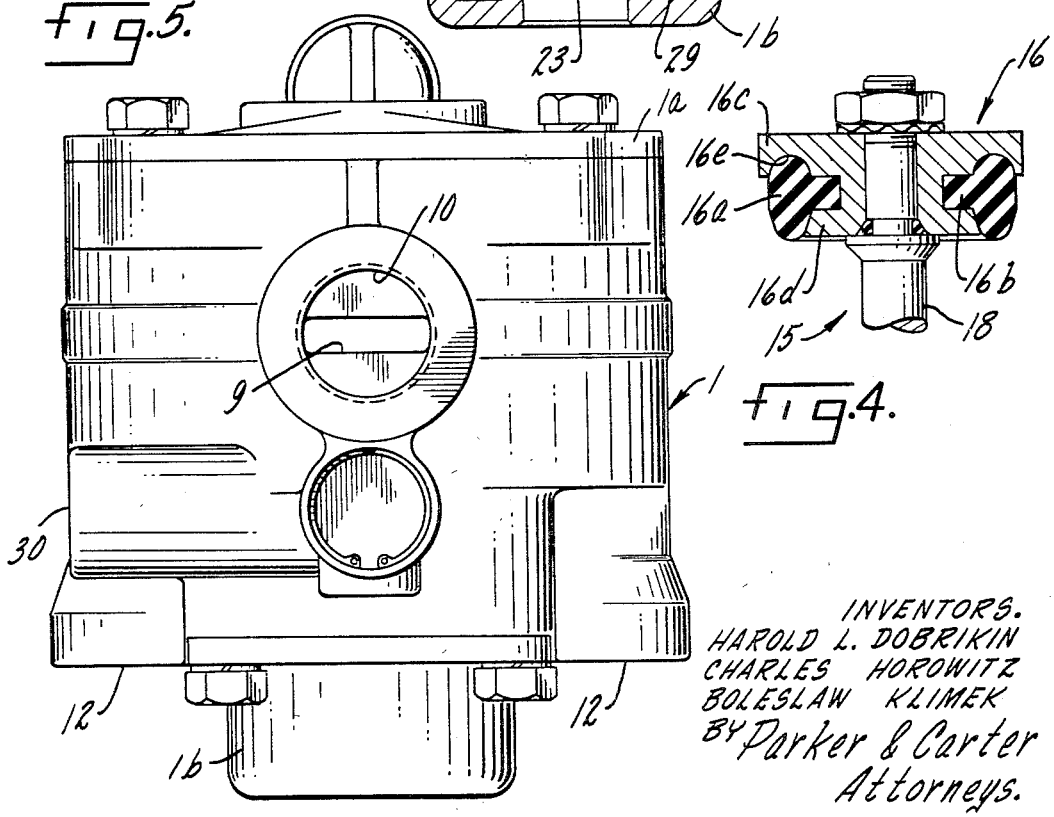

3,411,836
RELAY EMERGENCY MODULATING VALVE
Harold L. Dobrikin, Highland Park, Charles Horowitz, Niles, and Boleslaw Klimek, Des Plaines, Ill., assignors to Berg Mfg. & Sales Co., Des Plaines, Ill., a corporation of Illinois
Filed Aug. 23, 1967, Ser. No. 662,729
5 Claims. (Cl. 303—40)

ABSTRACT OF THE DISCLOSURE

A fluid pressure brake system relay valve assembly including a floating double piston dividing a chamber into a service subchamber and a transfer subchamber, a passage through said piston to communicate an air reservoir with the transfer subchamber, a double-headed valve carried by the piston with one of its heads controlling said passage and the other of its heads controlling an exhaust outlet for said transfer subchamber, an emergency piston yieldingly urged to close the exhaust passage and urged in the opposite direction by pressure from an emergency pressure system, whereby loss of emergency pressure produces application of braking pressure in a predetermined ratio, the emergency pressure being deliverable through the assembly of the invention to the emergency piston and to the reservoir and a check valve permitting flow of said emergency pressure to said reservoir and precluding said flow in the opposite direction.

Summary of the invention

A relay emergency modulating valve including a housing, a service inlet, a floating double-faced service piston dividing a chamber into a service subchamber and a transfer subchamber, a brake chamber passage and an exhaust passage each communicating with the transfer subchamber, a reservoir pressure inlet communicating with the area between the faces of said piston, a transfer passage between said area and said transfer subchamber, a double-headed valve carried by said piston and having one of its heads yieldingly urged into position closing said transfer passage and the other of its heads in position to close said exhaust passage, said exhaust passage being formed in an emergency exhaust and control piston yieldingly urged toward a position closing said exhaust passage and opening said transfer passage, said exhaust piston being subject to emergency system pressure delivered to said housing, a branch passage communicating said emergency system pressure with said reservoir with a check valve insuring against flow from said reservoir to said emergency system or said exhaust piston.

This invention relates to vehicle brake systems and particularly to fluid pressure systems such as the air system employed in connection with tractor-trailer vehicles and the like.

One purpose of the invention is to provide a relay emergency valve having a modulating capacity.

Another purpose is to provide a relay valve effective to supply a braking pressure to vehicle brakes substantially equal to the signal or service pressure supplied to the valve throughout the range of said signal pressures in both ascending and descending amounts.

Another purpose is to provide a relay emergency valve enabling emergency system pressure to fill a vehicle reservoir and to release vehicle brakes only when a predetermined safe pressure is present in said reservoir.

Another purpose is to provide a relay emegency valve having a service pressure-responsive system and an emergency pressure-responsive system, said systems cooperating to control a valve element effective to apply and release a set of vehicle brakes.

Another purpose is to provide a relay emergency valve effective to transmit pressures within minimum times to insure rapid application of vehicle brakes.

Another purpose is to provide a relay emergency valve effective to reduce wear of brake lining and heating of brake drums by rapid release of vehicle brakes through said valve.

Another purpose is to provide a relay emergency valve effective automatically to produce a first, gradual, limited application of vehicle brakes in response to loss of fluid pressure below a first predetermined level and a rapid, immediate application of full braking forces in response to loss of fluid pressure below another predetermined level.

Another purpose is to provide a relay emergency valve having a minimum number of parts subject to wear and maximum ease of maintenance and repair.

Another purpose is to provide a relay emergency valve having a free floating service piston movable in response to fluid pressures on opposite sides thereof.

Another purpose is to provide a relay emergency valve assembly including an emergency piston having a major surface responsive to emergency pressure and having an exhaust passage therethrough.

Another purpose is to provide a relay emergency valve having a double-surface floating service piston a double-headed valve carried by said service piston and an emergency piston having an exhaust passage therethrough and yieldingly urged in a direction toward said double-headed valve to close said emergency passage and open a passage through said piston for delivery of fluid pressure from a pressure supply to a brake-operating chamber.

Another purpose is to provide an emergency relay valve having an emergency piston held at a fixed position by emergency pressure, an exhaust passage through said emergency piston and a seat for a valve controlling said exhaust passage, said seat being located for contact by said valve when the emergency position is at said fixed position and being movable into contact with said valve in response to loss of emergency pressure.

Another purpose is to provide a relay emergency modulating valve of maximum compactness and simplicity and of minimum cost in manufacture and use.

Another purpose is to provide a valve head and seat effective to minimize formation of a set in the valve sealing material.

Other purposes may appear during the course of the specification and claims.

The invention is illustrated more or less diagrammatically in the accompanying drawings, wherein:

FIGURE 1 is a side view;
FIGURE 2 is a bottom plan view;
FIGURE 3 is a cross-sectional view taken on the line 3—3 of FIGURE 2;
FIGURE 4 is a partial enlarged detail; and
FIGURE 5 is an end view.

Like parts are indicated by like numerals throughout the specification and drawings.

Referring now to the drawings, the numeral 1 generally designates a housing including end closures 1a and 1b. Housing 1 has a chamber 2 with an open end closed by element 1a for ease of replacement of a free-floating double piston 3 in chamber 2. Piston 3 divides chamber 2 into a service subchamber 2a and a transfer subchamber 2b. A service pressure inlet 4 is formed in housing part 1a for delivery of fluid pressure to subchamber 2a. Piston 3 has an annular wall 5, having an outer surface 5a presented to subchamber 2a and a spaced annular wall 6 having an outer surface 6a presented to subchamber 2b. Spacers or legs 8 join the spaced walls 5, 6 of piston 3 and extend across the internal chamber 7 thus formed in piston 3. A reservoir inlet passage 9 is formed in housing 1 and communicates, at all positions of piston 3, with the chamber 7 therein. An inwardly threaded socket 10 is provided for connection with a suitable conduit (not shown) through which to deliver pressure from a suitable reservoir (not shown) to passage 9. An alternate supply fitting 10a is plugged when not in use.

Piston wall 6 is centrally apertured to provide passage 11 for communicating the chamber 7 within piston 3 with the subchamber 2b and thus with outlet passage 12, the passage 12 in turn communicating with the brake chambers or actuators (not shown) of the vehicle. As may be best seen in FIGURE 2, four passages 12 may be provided for communication with four such actuators.

Carried by piston 3 is a double-headed valve 15. The valve 15 has a first head or valve element 16 reciprocal within chamber 7 and urged into a position closing passage 11 by a spring 17. The spring 17 is carried by piston 3 and has its opposite ends engaging valve 15 and piston 3. Member 15 has a central shaft 18 extending through passage 11 and a second head or valve element 19 carried by the distal end of shaft 18.

Valve heads 16 and 19 being substantially identical, description of one will suffice. Head 16, for example, includes ring-like valve seal member 16a having an annular flange 16b extending inwardly intermediate the opposite ends of ring 16a and gripped by the metal element 16c. Head element 16c has a forward metal end surface 16d positioned only slightly inwardly of the outer annular end surface of ring 16a and for contact with the metal valve seat provided by wall portion 6b surrounding passage 11. The enlarged inner annular end portion of ring 16a is seated in a pocket 16e of element 16c and the outer circumferential surface of ring 16a is free of restraint.

Reciprocal in housing 1 is an emergency-exhaust control piston 20. The piston 20 has an axially positioned exhaust passage 21 communicating with the subchamber 2b as does passage 12. The exhaust passage 21 in turn communicates with a housing exhaust outlet 22 in which a filter 23 may be suitably positioned.

Piston 20 has a major circumferential portion 25 carrying a seal 26 in sliding engagement with the inner wall surface 27 of an emergency subchamber 28 formed by an outwardly open cylindrical housing part 1c, the open end of which is closed by closure 1b for ease of replacement of piston 20. Operative against the external surface of piston 20 and the inner surface of closure 1b is a spring 29. Operative against the opposite major annular surface of piston 20 within chamber 28 is the emergency fluid pressure of the vehicle system, which emergency pressure is delivered through emergency inlet 30. The inlet 30 communicates through a suitable passage portion 31 with the chamber 28 to urge the piston 20 against the action of spring 29.

Piston 20 has an axial extension 32 slidable in a boss 33 and carrying seal 34 in engagement with the inner cylindrical wall of boss 33. The extension 32 has an end annular surface 35 positioned for engagement with and to serve as a seat for valve head 19 to close the exhaust passage 21 which extends through the extension 32. Together, portion 25 and extension 32 form a differential piston 20. The seal 26 defines an area four times greater than that defined by seal 34 carried by extension 32. The area differential may be set as desired to provide the desired modulating operation described below.

A second passage portion 31a communicates with emergency inlet 30 and with a check valve subchamber 36 in which a check valve 37 is yieldingly urged to close passage portion 31a against communication with chamber 36. A passage 38 communicates chamber 36 with the inwardly threaded fitting portion 10 to communicate the emergency inlet 30 with a reservoir (not shown) when valve 37 is off its seat.

Whereas there has been shown an described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

As the parts are shown in FIGURE 3, the device of the invention is ready for normal brake operation. The vehicle operator manipulates a suitable application valve (not shown) to deliver service fluid pressure at inlet 4. Said pressure, operating against surface 5a of the free or floating service piston 3, causes the same to move within chamber 2 or downwardly as the parts are shown in FIGURE 3. It will be understood that, in such normal operation, the reservoir communicating at fitting 10 through passage 9 with chamber 7 maintains a supply of adequate fluid pressure available to and within the chamber 7. Since the opposite walls 5, 6 defining the chamber 7 are of equal size, the pressure within service piston 3 does not at this point affect the movement of piston 3. Downward movement of piston 3, however, carries with it the valve member 15 to seat valve head 19 against the seat 35 of emergency exhaust control piston 20 to close exhaust passage 21. Continued movement of piston 3 thereafter separates valve head 16 from its closing relationship with passage 11. Thus piston 20 and extension 32 provide a stop for valve 15 and insure separation of head 16 from seat 6b when piston 3 moves downwardly as the parts are shown.

With passage 11 thus opened, the fluid pressure always immediately present in chamber 7, passage 9 and the reservoir (not shown) is delivered rapidly through transfer subchamber 2b and passage 12 to the vehicle braking actuating chambers to apply the brakes. The absence of restrictions to the flow of said pressure provides for application of vehicle brakes in virtually immediate response to delivery of pressure to inlet 4. In such operation the emergency fluid pressure present in chamber 28 holds piston 20 in the position shown against a fixed abutment surface 40 of housing closure 1b and against the action of spring 29.

Piston 3, being free of any affect of springs or like elements and being psessuse-balanced, provides maximum equality between the signal or service pressure delivered to subchamber 2a and the brake pressure delivered through passage 12 to the vehicle brakes, the effect of friction constituting substantially the only factor working against absolute equality.

The equality or near equality of service and brake pressures achieved by the valve assembly occurs throughout the range of service brake pressures delivered at inlet 4 by the vehicle operator's manipulation of his brake pedal. If, for example, the operator depresses his pedal to deliver 10 p.s.i. to inlet 4, the balanced, free piston 3 will move downwardly, losing exhaust passage 21 and opening passage 11. Pressure will flow into the brake chambers and build rapidly in subchamber 2b and, acting against piston 3, will move it upwardly, as the parts are shown, to close passage 11. If the operator further depresses the pedal additional pressure will be delivered at inlet 4 and the sequence will be repeated through the ascending scale of service pressures up to the maximum of, say, 80 p.s.i The same is true as the operator releases the brake pedal. Should he do so in increments, the piston 3 will stop and passage 11 will close when the pressure above and below it are equalized of substantially equalized, higher pressures in subchamber 2a serving to open passage 11 and close exhaust passage 21, higher pressure in subchamber 2b serving to close passage 11 and open exhaust passage 21, a pressure balance being automatically sought and achieved in either case, the pressures in subchambers 2a and 2b being modulated as required throughout the range of said pressures.

It will be understood that the spring 29 is of predetermined force characteristic and that the emergency pressure supplied to chamber 28 through inlet 30 is of a predetermined pressure sufficient to hold the piston 20 in the position shown. A pressure greater than 55 p.s.i., for example, may be employed.

When the vehicle operator ceases operation of the application valve, and thus releases pressure from chamber portion 2a, the pressure in chamber 2b is effective as above-described, to return the service piston 3 to the position shown in FIGURE 2 which in turn withdraws valve 15, closing passage 11 in response to the action of spring 17 and withdrawing head 19 from its seat 35 to open communication between brake chamber passage 12 and exhaust passage 21 and thus to exhaust the brake chambers and release the brakes of the vehicle.

Upon initial start-up of the vehicle, assuming fluid pressure to be absent or virtually absent from the vehicle system, pressure is first delivered to emergency inlet 30. Until such pressure is delivered the spring 29 will have moved piston 20 upwardly to close exhaust passage 21 and to open passage 11, the distance between valve seat 35 and head 19 being less than the upward travel permitted to piston 20 as may be clearly seen in FIGURE 2. This condition will remain as long as the fluid pressure delivered by inlet 30 to chamber 28 is less than the predetermined amount required to compress spring 29 or until a pressure of the order, for example, of 55 p.s.i. is present in chamber 28.

The initial pressure thus delivered at inlet 30 unseats check valve 37 and flows through passage portion 38 to fill the reservoir of the vehicle. At the same time said pressure flows through passage 9, chamber 7 and open passage 11 to the brake chambers of the vehicle to apply the brakes during the filling operation. When a sufficiently safe pressure is present, for example 55 p.s.i., in the reservoir connected to fitting 10, the piston 20 will begin to move against the action of spring 29 and to close passage 11 and open passage 21 to exhaust the brake chambers connected to passage 12 and free the vehicle for movement as desired. When sufficient safe pressure is present in the reservoir connected to fitting 10, the check valve 37 will close to prevent return flow of pressure from the reservoir to passage portion 31a.

Thereafter, should the emergency fluid pressure available at inlet 30 and thus in chamber 28 diminish, for any reason, below a safe level, a modulated application of brake pressure will be supplied to the vehicle.

It will be understood that the parts are designed to provide a suitable ratio between the response of piston 20 to spring 29 and the pressure in chamber 28 and the amount of fluid pressure applied through passages 11 and 12 to the brake-actuating chambers of the vehicle. As expressed in terms of the amount of pressure loss in chamber 28, for example, it has been found suitable to provide for the delivery of four pounds of fluid pressure to the brake chambers through passage 12 in response to each drop of one pound of pressure in chamber 28 below the predetermined desired level. The desired ratio is achieved through the variance between the areas defined by seals 26 and 34, the said ratio in the present are between 4 to 1. For example, if 55 p.s.i. be provided for maintaining the piston 20 in the position shown in FIGURE 2, a drop of fluid pressure in chamber 28 to 54 pounds would provide for delivery of four pounds of fluid pressure through passage 12 to the vehicle brake chambers. Such delivery is accomplished by upward movement of piston 20 in response to spring 29 to close valve seat 35 against head 19 and thus to close exhaust passage 21 and to open valve 16 and passage 11 for delivery of fluid pressure therethrough to passage 12 and the vehicle brake chambers. Similarly, a drop of five pounds in chamber 28, for example, would produce delivery of 20 pounds of fluid pressure to the vehicle brakes. The pressure thus present in subchamber 2b will act against seat 35 or the area defined by seal 34 to reopen passage 21 whenever the differential with chamber 28 exceeds the predetermined desired ratio, thus providing a modulated gradual application of brake pressure as emergency pressure falls.

Should emergency fluid pressure be completely lost at inlet 30 and chamber 28, or should it fall below a predetermined level of the order, say, of 30 p.s.i., the spring 29 will immediately move piston 20 upwardly, as the parts are shown in the drawings, to close exhaust passage 21 and open passage 11 for delivery of full braking pressure automatically to the vehicle brakes through passage 12.

An immediate application of full brake pressure upon development of a relatively slow leak in the pressure system, for example, is undesirable and can be unsafe. Hence a gradual brake application is provided in direct, predetermined ratio to the system loss. If, however, a break occurs in the system, or the vehicle operator intentionally exhausts the system, or the leak drains the system below a predetermined level, immediate application of full braking force is available.

Thus is provided a modulated pressure delivery in both the normal service application and in the emergency application of the brakes.

The valve sealing action of valve heads 16 and 19 is accomplished by contact of the flexible material, such as that of ring 16a, with a metal seat such as seat surface 6a. Such contact, when the seal is rigidly held or restricted, produces a compression and a resultant permanent set in the seal material and impairs its sealing properties. In the present arrangement, the seal inner flange 16b is mechanically clamped, thus avoiding need for chemical bond with the metal head subject to air system impurities, and the sealing skirt or ring is free to expand outwardly. The ring 16a extends beyond metal head surface 16d for sealing contact with seat 6a, but surfaces 16d and 6a soon abut to limit the compression of ring 16a beyond that required for adequate sealing and thus to reduce or eliminate the formation of a deleterious permanent set or deformation of the seal and increase the working life of the seal.

To facilitate maintenance, piston 3 with valve 15 and piston 20 with spring 29 may be removed for repair or replacement by the mere removal of closures 1a and 1b, respectively.

There is claimed:

1. An emergency relay valve including a housing, a service piston freely reciprocal in said housing, a chamber in said piston, a reservoir fluid pressure inlet in communication with said chamber at all positions of said service piston, a transfer chamber in said housing, an outlet in said housing for communicating said transfer chamber with a brake-operating cylinder, a transfer passage in said service piston communicating said piston chamber with said transfer chamber, a valve member carried by said service piston and yieldingly urged into position closing said transfer passage, an emergency pressure chamber in said housing, an emergency inlet positioned in said housing to deliver emergency pressure to said emergency chamber, an emergency piston reciprocal in said emergency chamber, an exhaust passage through said emergency piston for communicating said transfer chamber with atmosphere, yielding means urging said emergency piston against the action of said emergency chamber pressure and toward contact with said valve member to close said exhaust passage, and an emergency passage communicating said emergency inlet with said reservoir inlet and a check valve closing said emergency passage in response to a predetermined pressure differential between said reservoir inlet and said emergency passage.

2. An emergency relay valve including a housing, a service piston freely reciprocal in said housing and dividing the same into a service chamber and a transfer chamber, said service piston having opposite faces of equal area and exposing one of said faces to said service chamber and the opposite of said faces to said transfer chamber, a piston chamber in said service piston and having opposite end walls of equal area, a service pressure inlet positioned in said housing to deliver fluid pressure to said service chamber, a reservoir pressure inlet positioned in said housing to deliver fluid pressure to said piston chamber at all positions of said service piston, a passage in said piston communicating said piston chamber with said transfer chamber, a valve member carried by said piston and yieldingly urged into position closing said passage, an emergency chamber, an emergency piston reciprocal in said emergency chamber, an exhaust passage through said emergency piston to communicate said transfer chamber with atmosphere, an emergency inlet positioned in said housing to deliver emergency fluid pressure to said emergency chamber, said emergency piston having a first surface exposed to pressure in said emergency chamber and a second surface exposed to pressure in said transfer chamber, said valve member including a first valve head positioned to control said piston passage and a second valve head positioned to control said exhaust passage, and yielding means urging said emergency piston toward said second valve head to bring said second emergency piston surface into contact with said valve head to close said exhaust passage.

3. The structure of claim 2 wherein said first surface has an area of the order of four times the area of said second surface.

4. The structure of claim 2 wherein pressure in said service chamber urges said service piston toward said emergency piston to unseat said first valve head and to seat said second valve head, said service piston being returnable in response to excess pressure in said transfer chamber to seat said first valve head.

5. The structure of claim 2 wherein said first emergency piston is movable in response to said yielding means and a diminution of pressure in said emergency chamber to seat said second valve head and unseat said first valve head, said service piston being movable in response to excess pressure in said transfer chamber over the pressure in said service chamber to seat said first valve head.

References Cited

UNITED STATES PATENTS

| 3,181,917 | 5/1965 | Dobrikin et al. | 303—40 |
| 3,240,534 | 3/1966 | Stelzer | 303—40 X |
| 2,937,052 | 5/1960 | Gates | 303—29 |
| 3,259,439 | 7/1966 | Bueler | 303—40 |

MILTON BUCHLER, *Primary Examiner.*

J. J. McLAUGHLIN, *Assistant Examiner.*